Figure 2:
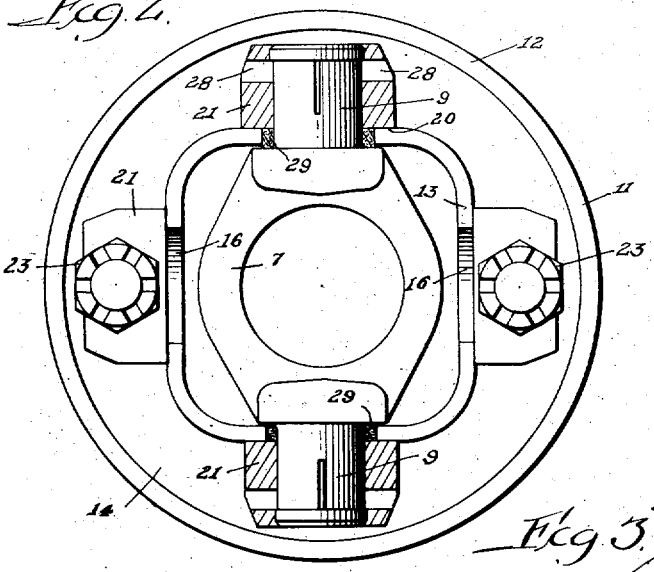

Jan. 13, 1925. Re. 15,980

C. L. ANDERSON

UNIVERSAL JOINT

Original Filed March 25, 1921

Inventor
Carl L. Anderson
By Wilson & McGann
Attys

Reissued Jan. 13, 1925.

Re. 15,980

UNITED STATES PATENT OFFICE.

CARL L. ANDERSON, OF ROCKFORD, ILLINOIS, ASSIGNOR OF ONE-FOURTH TO LEVIN FAUST, ONE-FOURTH TO ERIC S. EKSTROM, AND ONE-FOURTH TO CARL E. SWENSON, ALL OF ROCKFORD, ILLINOIS.

UNIVERSAL JOINT.

Original No. 1,450,707, dated April 3, 1923, Serial No. 455,610, filed March 25, 1921. Application for reissue filed February 11, 1924. Serial No. 692,161.

*To all whom it may concern:*

Be it known that I, CARL L. ANDERSON, a citizen of the United States, residing at Rockford, in the county of Winnebago and State of Illinois, have invented certain new and useful Improvements in Universal Joints, of which the following is a specification.

This invention pertains to universal joints of the so-called trunnion type, particularly adapted as coupling elements for the propeller shafts of motor vehicles, although equally well adapted for coupling any driving and driven members.

The primary object of the present invention is to provide a novel universal joint characterized by an oil reservoir of relatively large capacity embodied in a compact and unique construction, whereby to insure perfect lubrication of the trunnion bearing during a considerably longer period of usage than is possible with prior constructions. To this end I have aimed to utilize a transmission housing, that is, the part that couples the terminal trunnion members, as a reservoir permitting the use of liquid lubricant without danger of leakage or waste. Furthermore, I have so constructed and arranged the trunnion bearings within the reservoir as to insure at all times lubrication thereof with a thin film of oil, thereby greatly increasing the life of the universal joint and promoting general efficiency.

Another important object of my invention resides in the novel construction of the universal joint, with the view to economy in production; and I have contemplated a joint comprising but few parts, all of which may be produced by what are considered ordinary and simple machine operations. More particularly my invention contemplates constructing the combined transmission housing and oil reservoir in several parts, each in the form of a stamping, and in clamping these together by means of parts which serve also as the bearings for the trunnions. Thus, the principal parts perform dual functions and promote economy and efficiency.

Another object is to provide a universal joint of the character described which shall be dust and dirt proof and in which the trunnion surfaces shall always be covered by their complemental bearing surfaces and lubricated by a thin film of oil.

Other objects and attendant advantages will be appreciated by those familiar with this art as the invention becomes better understood by reference to the following description when considered in connection with the accompanying drawing, in which—

Figure 4:
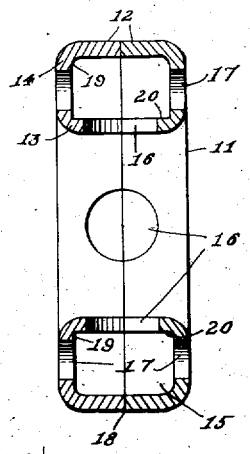
Figure 3:
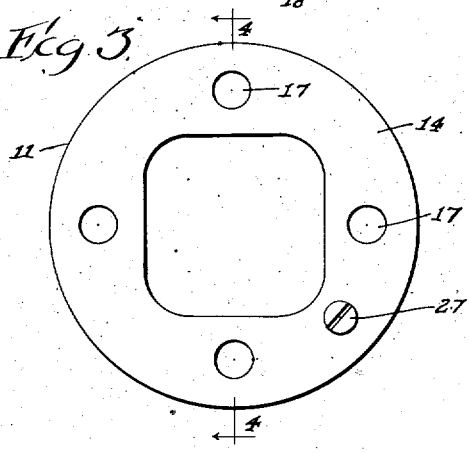
Figure 1:
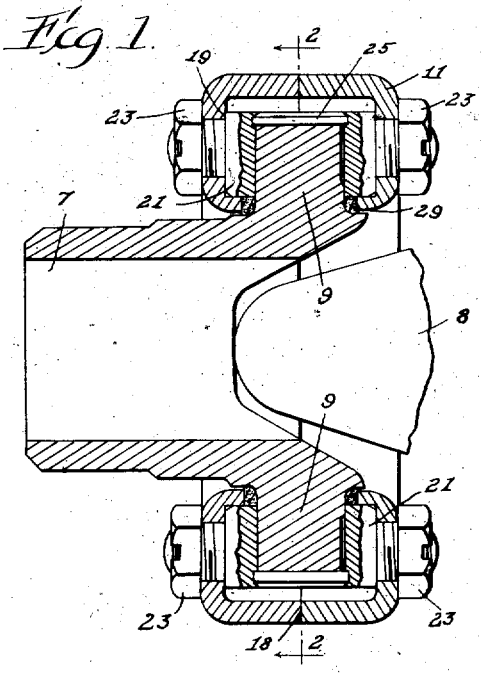
Figure 5:
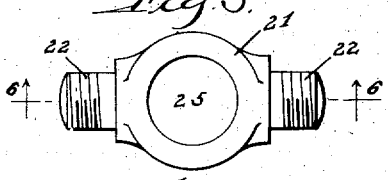

Figure 1 is a longitudinal sectional view centrally through a universal joint embodying my invention;

Fig. 2, a transverse sectional view taken substantially on the line 2—2 of Fig. 1, with the horizontally disposed trunnion member removed, and showing the trunnion bearings therefor and their clamping nuts in elevation;

Fig. 3, a detail end view of the transmission housing;

Fig. 4, a sectional view through said housing taken on the line 4—4 of Fig. 3;

Fig. 5, a top view of one of the trunnion bearing blocks; and

Figure 6:
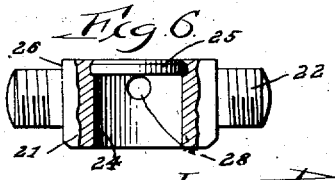

Fig. 6, a sectional view through the block taken on the line 6—6 of Fig. 5.

The terminal coupling members designated generally by characters 7 and 8 which connect to the driving and driven members, may be of any suitable or preferred construction, and at present are of the well known trunnion type, each terminating at one end in a pair of opposed coaxial trunnions 9. I propose in the present invention to provide novel means for connecting these trunnions, including efficient bearings, which shall be dust and dirt proof and thoroughly lubricated at all times.

The principal coupling part is in the form of a transmission housing designated generally by 11, which is so shaped that it also provides an oil reservoir of relatively large capacity. I have proposed, for convenience in manufacture merely, to form this transmission housing of a plurality of parts, preferably of two half sections, each identical in construction. In order to promote economy in production, I prefer that these half sections shall each be in the form of a stamping, that is, a part pressed from sheet metal of the proper gauge. I have accordingly shaped each half section to provide an outer annular wall 12, and an inner four-sided wall 13 joined by an end wall 14.

These sections when placed together as shown in Fig. 4, form an annular lubricant reservoir 15 of large capacity considering the outside diameter of the transmission housing. Quarteringly arranged holes 16 are formed in the inside wall 13 for the reception of the trunnions 9; and in the same radial planes holes 17 are formed in the end walls 14 for the reception of the parts which clamp the transmission sections together. After these sections have been formed the meeting surfaces 18 will be accurately machined and the surfaces 19 on the inside of the walls 14 contiguous to the holes 17, will be machined using the surfaces 18 as a gauge. The surfaces 20 will likewise be machined to provide a close joint for the inner ends of the bearing blocks which will now be described.

The transmission sections are clamped together through the agency of parts 21 disposed within the oil reservoir 15 and having diametrically opposed threaded ends 22, which extend through the openings 17 and are equipped with clamping nuts 23. These parts 21 also provide bearings for the trunnions 9. To this end, I prefer to, but do not necessarily, employ a bearing construction such as described in my U. S. Letters Patent No. 1,450,706, in which the bearing body is provided with a through opening 24 which may be accurately machined, and an end thrust bearing cap 25 permanently secured in the outer end of the body or block 21, as explained in said patent. In the present invention, however, the major axis of each bearing block extends transverse to the trunnion housing, that is, transverse to the plane in which it revolves, instead of parallel with it, or in a radial plane as in said patent. The dimension between the shoulders 26 at the ends of each bearing block is such that when the parts are assembled, as shown in Fig. 1, and the nuts 23 are tightened, the meeting surfaces 18 of the transmission block sections, if a sectional block is employed, will be brought together under pressure before the surfaces 19 engage the shoulders 26, so that the final clamping will insure an absolutely tight joint at 18, and at the same time rigidly secure the bearing blocks 21 in position and effect as it were, an integral one-part transmission block structure. Any suitable lock nut means may be provided for preventing displacement of the nuts 23.

It is especially desirable to use a liquid lubricant of such consistency and grade that it will flow freely as distinguished from the heavier grades of oil and grease necessitated by prior constructions, which invariably do not reach all of the bearing surfaces, with detrimental results. By reason of the present construction, I am able to use the proper grade of oil to insure most efficient lubrication. The reservoir 15 may be filled through a suitable supply opening closed by a plug 27, and the oil passes through holes 28 in each block 21 to the trunnion bearing surfaces. The joint at the inner end of each trunnion bearing is effectually sealed by a packing 29 of suitable material, such as felt.

I have found from experimentation and thorough tests that a universal joint properly constructed as disclosed herein, is absolutely dust and dirt proof and oil tight; that with oil of the proper grade and consistency a joint of this kind will transmit a given load, higher than the average for a considerably longer period than is possible with other makes of commercial universal joints, thereby assuring that a manufacturer can warrant the joint for much longer use than is permitted by prior constructions; and that this unusual durability and longevity may be attributed to the fact that relatively large area trunnion bearings, including the end thrust bearings, are covered at all times by the complemental bearing surfaces and are dust and dirt proof and that these surfaces are continually covered with a thin film of oil, thereby reducing wear and friction to the minimum. It will also be observed that with relation to the outside diameter of the trunnion coupling members, the joint structure is especially compact and that the few parts are so designed as to be capable of production by simple machine operations at a comparatively low cost.

It is believed that the foregoing conveys a clear understanding of the objects prefaced above, and while I have illustrated and described but a single working embodiment thereof, it should be understood that various changes might be made in the construction and arrangement without departing from the spirit and scope of the invention as expressed in the appended claims; in which—

I claim:

1. A universal joint comprising trunnion-type terminal coupling members, a transmission housing formed to two annular sections shaped to jointly provide an oil reservoir of large capacity, and trunnion bearing blocks within said reservoir providing bearings for the trunnions and serving also for clamping said sections together.

2. In a trunnion-type universal joint, a transmission housing comprising a plurality of annular parts shaped to jointly provide an annular oil reservoir of relatively large capacity, and means clamping said parts together and providing bearings for the trunnions.

3. In a trunnion-type universal joint, a transmission housing formed of a plurality of annular sections providing an oil reservoir of relatively large capacity, and trunnion bearing blocks within said reservoir, having threaded ends extending through the end walls of the reservoir and equipped at the exterior thereof with nuts for clamping the reservoir sections together.

4. A universal joint comprising a pair of trunnion-type terminal coupling members, a transmission housing formed in two half sections, each U-shaped in cross section and jointly providing an annular oil reservoir, a bearing block for each trunnion disposed within said reservoir and having threaded ends extending through the end walls of the transmission sections, and nuts on said ends for clamping said sections together.

5. In a trunnion-type universal joint, a transmission housing comprising a plurality of annular parts shaped to jointly provide an annular oil reservoir of relatively large capacity and having quarteringly arranged holes through the end walls and through the inner walls of the reservoir, a bearing block for each of the trunnions which extends through one of the second mentioned holes, each bearing block having diametrically opposed threaded ends extending through the first mentioned holes, and nuts on said ends for clamping said parts together and to the bearing blocks.

6. In a trunnion-type universal joint, the combination of terminal coupling members, a combined transmission housing and oil reservoir formed of two half sections each having an annular outer wall and a four sided inner wall joined by an end wall, the inner walls having openings for the reception of the trunnion ends, and bearing blocks for the trunnion ends within the reservoir and serving for clamping the sections together.

7. In a trunnion-type universal joint, the combination of terminal coupling members, a combined transmission housing and oil reservoir formed of two half sections each having an annular outer wall and a four-sided inner wall joined by an end wall, the inner walls having openings for the reception of the trunnion ends, bearing blocks for the trunnion ends within the reservoir and serving for clamping the sections together, said bearing blocks having oil holes connecting the oil reservoir with the trunnion bearing surfaces, and an oil-tight packing at the inner end of each trunnion bearing.

8. In a trunnion-type universal joint, the combination of a transmission housing formed of a plurality of sections providing an annular oil reservoir of relatively large capacity, and parts disposed within said reservoir, each carrying bearings for the trunnions and serving to hold said sections together.

9. In a universal joint, the combination of coupling members, a sectional transmission member, and trunnion connections between said members, including a bearing block for each trunnion serving for connecting the sections of the transmission member together.

10. In a universal joint, the combination of coupling members, a sectional transmission member, and trunnion connections between said members, including a bearing block for each trunnion serving for connecting the sections of the transmission member together, each bearing block having a through opening providing radial bearing for its trunnion, and a bearing member secured in the outer end of each bore providing a bearing surface complemental to the outer end of its trunnion for taking the end thrust of the latter.

11. In a universal joint, in combination, coupling members, a transmission housing shaped to provide a lubricant reservoir, and having an inner and outer wall joined by end walls, and trunnion connections between said coupling members and housing comprising trunnions, bearing blocks therefor disposed within the lubricant reservoir and having ends extending through the end walls of the housing, and means for securing said ends to said end walls for holding the bearing blocks in operative position.

12. In a trunnion type universal joint, in combination, a transmission housing, defined by an inner and an outer wall joined by end walls, coupling members each having opposed co-axial trunnions, said housing providing a lubricant reservoir having quarteringly spaced openings through which said trunnions enter the housing, said end walls having openings in the radial planes of said trunnion openings, and a bearing-supporting member for each trunnion having ends extending through said openings in the end walls and being supported on said end walls in rigid relation thereto.

13. In a trunnion type universal joint, in combination, coupling members having trunnions, a transmission housing providing a lubricant reservoir, said trunnions being positioned within the reservoir intermediate the end walls of the housing, a bearing-supporting member for each trunnion, and means in connection with each bearing-supporting member extending through each end wall of the housing and engaging the outer face thereof for holding said bearing-supporting member in operative position within the housing.

14. In a trunnion type universal joint, in combination, coupling members having trunnions, a transmission housing providing a lubricant reservoir, and a bearing block for each trunnion positioned within the transmission housing with its major axis transverse thereto, and having ends extending through the end walls of said housing and connected with the outer faces thereof.

15. In a universal joint, in combination, coupling members having opposed coaxial trunnions, a hollow transmission housing formed from a plurality of sections providing a lubricant reservoir, and bearing-supporting members within the transmission housing providing journal bearings for the trunnions and having clamping engagement with opposite ends of said housing for clamping the interposed housing and holding said members in operative position.

16. In a universal joint, in combination, coupling members having opposed coaxial trunnions, a hollow transmission housing formed from a plurality of sections providing a lubricant reservoir, and bearing-supporting members within the transmission housing providing journal bearings for the trunnions and having diametrically opposed ends extending through end walls of the housing and having means engaging the outer face of each end wall, said means including a nut threaded on one of said ends and adapted to be tightened thereon for clamping said means against the interposed end walls.

17. In a universal joint, in combination, coupling members having trunnions, a hollow transmission housing providing a lubricant reservoir, said housing having an inner and an outer wall joined by end walls, the inner wall having quarteringly spaced openings through which the trunnions enter the housing, each end wall having openings in the radial planes of said openings in the inner wall, and means carrying a bearing for each trunnion, each bearing-carrying means having ends extending through said openings in the end walls and being clamped to the outer faces thereof.

18. In a universal joint, in combination, coupling members having trunnions, a hollow transmission housing providing a lubricant reservoir, and bearing blocks for the trunnions disposed within said housing and having diametrically opposed ends extending through opposite walls thereof and having means engaging outer surfaces of said walls and adapted to be drawn together for clamping the interposed walls.

19. In a universal joint, in combination, coupling members having trunnions, a hollow transmission housing providing a lubricant reservoir, and bearing blocks for the trunnions each having diametrically opposed ends in a plane transverse to its bearing axis supported on opposite walls of said housing for holding its bearing block in operative position.

20. In a universal joint, in combination, coupling members having trunnions, a hollow transmission housing providing a lubricant reservoir, said housing having end walls and being formed of a plurality of sections separated intermediate said end walls but adapted to be secured together to provide an oil tight joint, and bearing-supporting means for each trunnion having opposed ends passing through said end walls, and means on said ends adapted to be clamped against the outer faces of said end walls.

21. In a universal joint, in combination, coupling members having trunnions, a hollow transmission housing having an inner and an outer wall joined by end walls providing a lubricant reservoir, said housing being formed of two sections separated intermediate said end walls and adapted to be secured together at their meeting edges to provide an oil-tight joint, the inner wall of said housing having openings through which the trunnions enter the housing, a bearing-supporting block for each trunnion within the housing having diametrically opposed locating and supporting ends mounted on the end walls of the housing, and means putting the housing sections under compression tending to clamp said meeting edges together.

22. In a universal joint, in combination, coupling members having trunnions, a transmission housing providing a lubricant reservoir having openings through which the trunnions enter the housing, and a bearing-supporting member for each trunnion adapted to be positioned within the housing and having diametrically opposed ends rigidly but removably mounted on the end walls of the housing.

23. In a universal joint, in combination, coupling members having trunnions, a hollow transmission housing providing a lubricant reservoir, and bearing members for the trunnions, each supported in the housing by opposed ends which pass through end walls of said housing and are clamped thereto by means including a nut threaded on one of said ends.

24. In a universal joint, in combination, coupling members having trunnions, a hollow transmission housing providing a lubricant reservoir, the trunnions extending into said housing, and bearing members for the trunnions extending transversely through the transmission housing and mounted rigidly but detachably thereon, with the major axis of each bearing member transverse to the plane in which the transmission housing revolves.

25. In a universal joint, in combination, coupling members having trunnions, a transmission housing having quarteringly spaced openings for the reception of the trunnions, bearing members for the trunnions, each bearing member being adapted to be positioned between the end walls of the transmission housing and having an end extending through one of said end walls, a shoulder on each of said bearing members adapted to bear against one of said end walls, and a nut threaded on one of said extended ends and adapted to be tightened against the adjacent end wall for rigidly securing its bearing member with respect to the housing.

26. In a universal joint, in combination, coupling members having trunnions, a transmission housing providing a lubricant reservoir and having quarteringly spaced openings in its inner wall through which the trunnions enter the housing, a bearing member for each trunnion having ends extending through and fixed to the end walls of the housing, and a packing between the inner end of each trunnion and the adjacent parts of the housing and respective bearing member.

27. In a universal joint, in combination, coupling members having trunnions, a transmission housing formed from a plurality of sections which meet in a plane parallel with the plane of rotation, said housing providing a lubricant reservoir and having quarteringly spaced openings in its inner wall through which the trunnions enter the housing and having openings in its end walls in the radial planes of said trunnion openings, bearing means for each trunnion disposed within the housing and having ends located in said openings in the end walls, and means for securing said ends to the end walls including a member threaded on one of said ends and adapted to be tightened against the adjacent end wall, whereby to simultaneously compress the housing transverse to said plane.

28. In a universal joint, in combination, coupling members having trunnions, a hollow transmission housing forming a lubricant reservoir, said housing having inner and outer walls joined by end walls and being formed of a plurality of sections separated intermediate said end walls, said inner wall having quarteringly spaced openings through which the trunnions enter the housing, the end walls having openings in the radial planes of said trunnion openings, means providing a journal bearing for each trunnion, each of said means being disposed within the housing and having opposed ends reaching through said openings in the end walls, and means on said opposed ends engaging the outer faces of said end walls and adapted to be relatively drawn together whereby to put the housing sections under compression and whereby to hold the bearing means in rigid relative relation to the housing, so that said bearing means together with the housing, constitute a relative rigid structure.

29. A universal joint as set forth in claim 28, including a packing between the inner end of each trunnion, the bearing means and the wall of the opening through which the trunnion enters the housing, said packing being put under compression by drawing the housing sections together.

30. In a universal joint, in combination, coupling members having trunnions, a hollow transmission housing forming a lubricant reservoir, said housing having inner and outer walls joined by end walls and being formed of a plurality of sections separated intermediate said end walls, said inner wall having quarteringly spaced openings through which the trunnions enter the housing, the end walls having openings in the radial planes of said trunnion openings, means providing a journal bearing for each trunnion, each of said means being disposed within the housing and having opposed ends reaching through said openings in the end walls, means on said opposed ends engaging the outer faces of said end walls and adapted to be relatively drawn together, whereby to put the housing sections under compression and whereby to hold the bearing means in rigid relative relation to the housing, so that said bearing means together with the housing, constitute a relative rigid structure, a packing between the inner end of each trunnion, the bearing means and the wall of the opening through which the trunnion enters the housing, and an end thrust bearing surface for the outer end of each trunnion rigid with respect to the transmission housing.

CARL L. ANDERSON.